Aug. 28, 1951   B. H. KOOKEN   2,565,818
ROTARY WATER DISTRIBUTOR
Filed Oct. 7, 1946   2 Sheets-Sheet 1
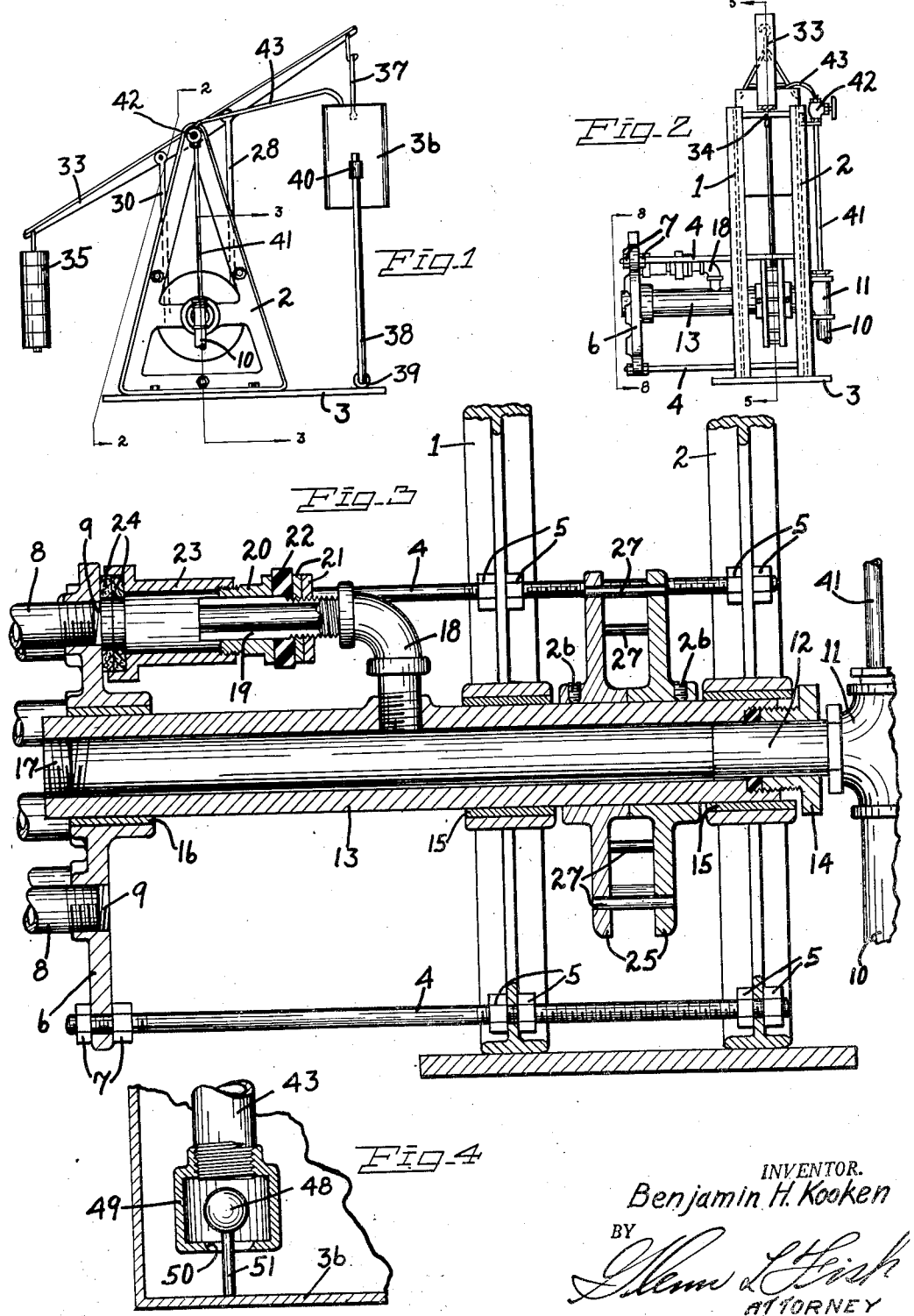
INVENTOR.
Benjamin H. Kooken
BY
ATTORNEY

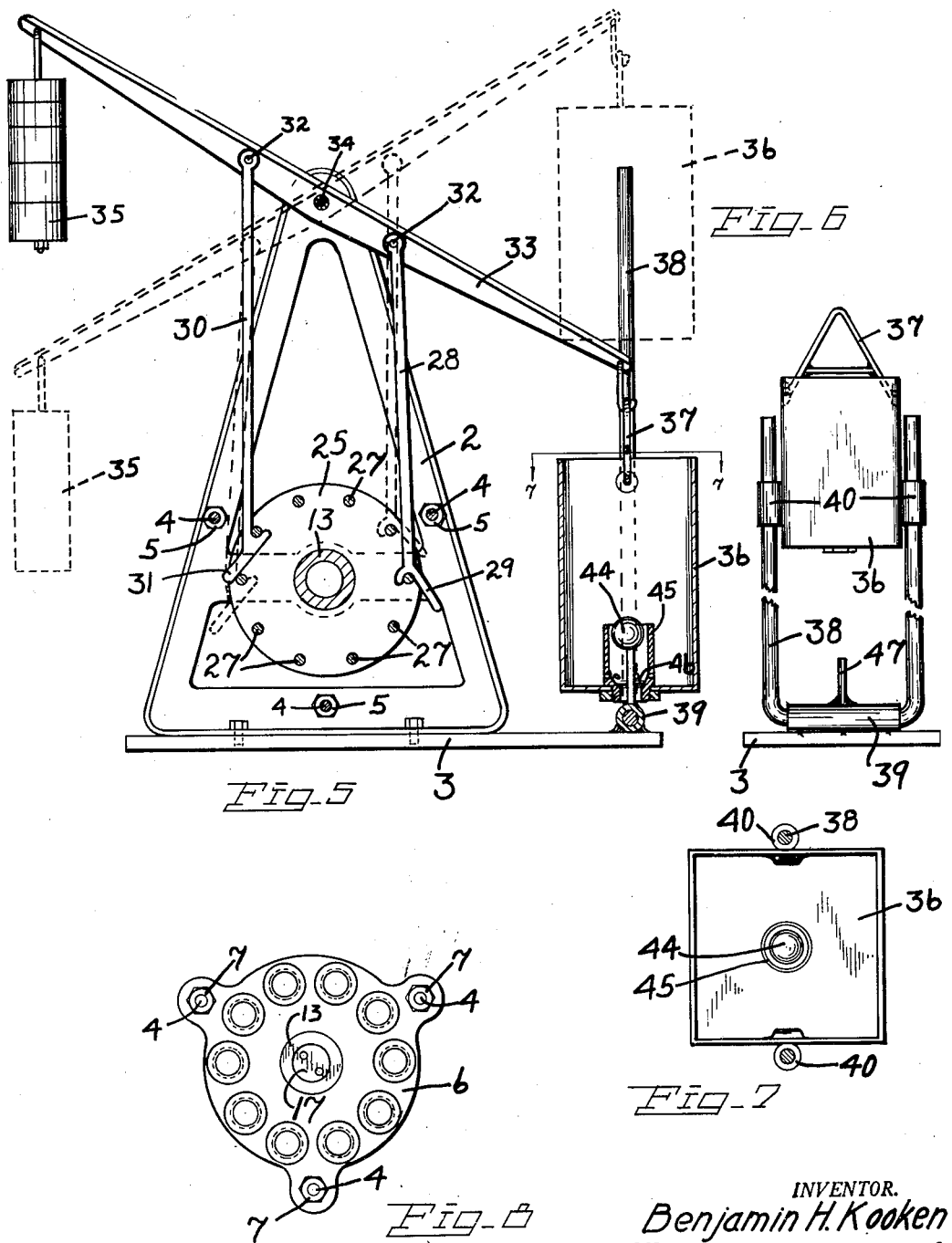

Patented Aug. 28, 1951

2,565,818

UNITED STATES PATENT OFFICE 2,565,818

ROTARY WATER DISTRIBUTOR

Benjamin H. Kooken, Spokane, Wash.

Application October 7, 1946, Serial No. 701,700

4 Claims. (Cl. 251—87)

My present invention relates generally to water distribution of hydraulic engineering, and more specifically to an improved rotary water distributer or timing and distributing mechanism for water sprinkling systems employing multiple distributing pipes. The primary object of the invention is the provision of an appliance of this character which is automatically and intermittently operated and controlled to successively feed water to a series of distributing pipes of the sprinkling system, from a main supply. A rotary distributor cooperates with the series of distributing pipes, and the distributor is operated and governed by a weight operated mechanism under control of an auxiliary regulating water supply.

In carrying out my invention I utilize a minimum number of component parts that may with facility be manufactured at low cost of production and assembled with convenience to provide a rotary distributor that is economical and effective in operation, simple in construction, durable, reliable, and inexpensive in maintenance.

The invention consists in certain novel combinations and arrangements of these component parts as will hereinafter be described, and more specifically set forth in the appended claims.

In the accompanying drawings I have illustrated one complete example of the physical embodiment of my invention wherein the parts are combined and arranged in accord with one mode I have devised for the practical application of the principles of my invention. It will, however, be understood that changes and alterations are contemplated and may be made in these exemplifying drawings and mechanical structures within the scope of my claims, without departing from the principles of my invention.

Figure 1 is a side view in elevation of a water distributer in which my invention is embodied; and Figure 2 is an end view of the appliance as at line 2—2 of Fig. 1.

Figure 3 is an enlarged detail vertical longitudinal sectional view as at line 3—3 of Fig. 1.

Figure 4 is a detail vertical sectional view showing the water control valve of the actuating mechanism of the rotary distributor.

Figure 5 is an enlarged detail vertical sectional view as at line 5—5 of Fig. 2.

Figure 6 is an enlarged view in elevation of the water-carrying tank utilized as an overbalancing weight for the actuating mechanism.

Figure 7 is a horizontal sectional view at line 7—7 of Fig. 5 showing a top plan view of the bucket or tank and its control valve.

Figure 8 is a view at line 8—8 of Fig. 2 disclosing the stationary distributing head or plate for the annular series of distributing pipes.

In the assembly views I have illustrated two upright A-frames 1 and 2 that are spaced apart and mounted rigidly upon a base plate or bed 3, and these A-frames are rigidly united by means of horizontal tie bars or bolts 4 passing through bolt holes of the frame members and secured by lock nuts 5.

As best seen in Figs. 2 and 3 the tie bolts 4 project laterally from the upright frame members, and a stationary plate or circular head 6 is mounted on the ends of the bolts and firmly fixed in upright position by lock nuts 7.

At the outer side of the fixed head 6 an annular series of distributing pipes 8 of the sprinkling system are threaded into complementary bosses of the head, and the holes 9 of the head into which the pipes are threaded, at the inner side of the head form inlet ports for the distributing pipes. As here shown provision is made for ten distributing pipes, but it will be understood that this number may be varied as desired; and the open ports 9 are successively and selectively closed, intermittently, by a single rotary supply nozzle which supplies a stream of water to successive pipes.

The main water supply, under pressure from a suitable source is furnished through pipe 10 in Figs. 2 and 3, which is connected with a fitting 11 having a horizontal extension or sleeve 12 that projects into a rotary distributing head in the form of a cylinder 13, and the joint between the stationary sleeve and the rotary cylinder is packed with a gland 14 and gasket or washer to prevent leakage of water at this connection.

The horizontally disposed, rotary head or cylinder forms a distributing reservoir for the water supply under pressure, and the tubular head is journaled in bearings 15, 15 of the A-frames and a bearing 16 of the stationary head 6, with a screw plug 17 closing the left end of the cylinder in Fig. 3.

Between the A-frames and the fixed distributer head the rotary head is equipped with a water-conveyor that revolves with the rotary tubular head, and this conveyor or tubular coupling revolves with the intermittently operated rotary distributer head for successive co-action with the fixed distributer head to supply water to the distributer pipes. For this purpose, and as best seen in Fig. 3, the rotary tubular head is provided with an elbow fitting 18 opening to the interior of the cylinder 13, with the smooth exterior of its horizontal stub pipe 19 projecting through a coupling nut 20. The coupling nut 20 is loosely mounted on the stub pipe and the inner end of this pipe is externally threaded to accommodate lock nuts 21 that retain a resilient washer 22 which forms a pad or cushion to permit adjustment of the coupling.

A cylindrical discharge head 23 is threaded on the outer externally threaded end of the coupling nut 20 to enclose the stub pipe or nozzle 19, and the free end of the discharge head is flanged to form a recess to accommodate a pair of washers 24, 24.

As thus disclosed and described it will be apparent that the conveyor or coupling revolves with the intermittently rotated cylinder 13, and the discharge head 23 with its washers 24 successively registers with the ports 9 to discharge a supply of water into the distributing pipes.

For intermittently imparting a rotary movement to the rotary distributer, a pawl and ratchet mechanism is utilized and this mechanism is operated by gravity through the use of a tank loaded with water from an auxiliary supply. For this purpose, the rotary distributer head is equipped with a ratchet wheel including duplicate spaced disks 25, 25 that are secured by set screws 26 in their hubs to the rotary head, and the circular disks are provided with transverse pins 27 arranged in an annular series and spaced circumferentially within the wheel. The pins correspond in number to the ten distributing pipes, and the ratchet wheel is located between the two A-frames 1 and 2.

For co-action with the ratchet wheel two pivotally suspended actuating bars are indicated in Fig. 5 as bar 28 with an actuating pawl 29 for engagement with and depression of a pin 27, and bar 30 having a detent 31 for co-action with a pin at the opposite side of the ratchet wheel. These bars are suspended on pivot pins 32 from an oscillating or rocking beam 33 pivotally mounted at 34 between the two A-frames 1 and 2 and located above the distributer head.

One end of the rocking beam is equipped with a pivotally suspended weight 35, and the opposite end of the beam is provided with a bucket or water tank 36 suspended by its bail 37 from the beam. The water tank, here shown as square in cross section, is adapted for vertical movement and it is guided in its movement by means of a U-shaped yoke 38 pivotally mounted in a sleeve 39 fixed on the base 3, and the tank is provided with a pair of exterior slide sleeves or collars 40 adapted to travel up and down, with the tank, on the arms of the yoke.

The counterbalanced tank is filled, intermittently, with an auxiliary supply of water from the main pipe through a branch pipe 41 connected with the T-fitting 11, and the branch pipe is equipped with a control valve 42 manually operated, and a discharge pipe 43 supported from the upright frame and located in position to discharge water into the open top of the tank.

With the tank in the elevated dotted line position of Fig. 5 the tank is filled with water to a weight that overcomes the weight of the counterbalance 35 causing the tank to descend, rock the beam 33 and cause the bars 28 and 30 and pawls 29 and 31 to impart movement to the ratchet wheel and rotary distributer head, to register its conveyor or coupling with a succeeding port in the fixed head 6.

At the end of its down stroke or movement, the tank is emptied, while water is being supplied to a distributing pipe, and as the tank is emptied of water, the counterbalancing weight rocks the beam 33 and the pawls 29 and 31 move counterclockwise, thus returning to the normal position as shown in the dotted position at Fig. 5. It will be seen pawls 29 and 31 are again in position to rotate the ratchet mechanism upon the filling of the bucket 36.

For automatically emptying the tank a ball valve 44 is confined in a casing 45 located in the bottom of the tank and the casing is provided with a valve seat 46 opening through the bottom of the tank, and the ball valve when seated is held by the weight of the water in the tank to prevent escape of the contained water.

For opening the valve, the fixed sleeve 39 is provided with a rigidly fixed upright stem 47 that is adapted to project upwardly through the open seat 46 and unseat the valve 44, thus permitting the water to flow through the bottom of the tank, as indicated in Fig. 5. Then, when the tank is lifted by gravity action of the weight 35, the ball valve falls back into its seat to close the outlet port.

Thus, with the intermittent filling and emptying of the tank, and through the medium of the ratchet mechanism, the rotary distributor head is rotated to distribute water to the series of distributing pipes. At the outlet of discharge pipe 43 I have provided a ball valve 48, confined in a housing 49 having a valve seat 50. Ball 48 is provided with a stem 51 extending downward to contact the bottom of bucket 36 when in a raised position and allow water to flow into the bucket. Upon the lowering of bucket 36, ball 48 is allowed to seat in valve seat 50, thus discontinuing the flow of water until the bucket is raised again.

Having thus fully described my invention what I claim as new and desire to secure by Letters Patent is:

1. In a water distributor, a frame, a supply pipe rotatably mounted horizontally in said frame and projecting outwardly therefrom and closed at its outer end, the inner end of said pipe being adapted for connection with a source of water under pressure, horizontal rods carried by said frame and projecting outwardly therefrom, a disk carried by outer ends of said rods and formed with an opening through which the outer end of said pipe is rotatably mounted, said disk being provided with threaded openings arranged in a circular path extending about the supply pipe, distributor pipes screwed into the threaded openings and projecting outwardly from said disk, an outlet pipe extending laterally from said supply pipe and having its outer portion extending forwardly in spaced parallel relation to the supply pipe, a coupling carried by the outer portion of said outlet pipe, a head carried by said coupling and projecting from the outer end of the outlet pipe and terminating in a cup-shaped outer end disposed close to said disk, packing in the cup-shaped outer end of said head and having close fitting engagement with the disk to provide a water tight joint between the head and the disk, and means for rotating said supply and progressively moving the head into successive alignment with the threaded openings of the head for discharge of water through the distributor pipes.

2. In a water distributor, a frame, horizontal rods carried by said frame and projecting forwardly therefrom, a vertical disk carried by outer ends of said rods and formed with a bearing and a series of openings arranged in a circular path about the bearing, distributor pipes mounted in the openings and projecting forwardly from said disk, a cylinder rotatably mounted through said frame and projecting forwardly therefrom with its front and rotatably mounted in the bearing of said disk, said cylinder being closed at its front end and having its rear end adapted for connection with a source of water under pressure, a distributor pipe extending laterally and forwardly from said cylinder and at its front end being provided with a head disposed in position for successively registering with the openings of the disk during rotation of the cylinder, packing carried by the head of the distributing pipe for bearing against the rear face of the disk and forming a tight joint between the head and the disk, and means for rotating said cylinder.

3. A water distributor comprising a frame, a cylinder rotatably mounted in said frame and projecting outwardly therefrom, and being closed at its outer end and provided with an inlet, a disk rigidly mounted about the outer portion of said cylinder and formed with outlet openings arranged in a circular path about the cylinder and concentric therewith, distributor pipes leading from the openings of said disk, an outlet pipe leading from said cylinder and extending towards said disk and terminating in a head disposed in position for successively registering with the openings of the disk and discharging water into the distributor pipes during rotation of the cylinder, and means for rotating said cylinder.

4. A water distributor comprising a support, a member rigidly mounted vertically on said support and formed with openings arranged in a circular path, distributor pipes leading from said openings, a horizontal cylinder rotatably mounted through said support and provided with an inlet, an outlet pipe leading from said cylinder and towards said member and provided with a discharge head terminating in close proximity to a confronting side face of the said member in position for registering with the openings therein during rotation of the cylinder, packing carried by said head for forming a tight joint between the head and the said member and means for rotating said cylinder.

BENJAMIN H. KOOKEN.

REFERENCES CITED

The following references are of record in the file of this patent:

UNITED STATES PATENTS

| Number | Name | Date |
|---|---|---|
| 170,532 | Dennisson | Nov. 30, 1875 |
| 446,134 | Huffman | Feb. 10, 1891 |
| 511,075 | Franke | Dec. 19, 1893 |
| 674,142 | De Wisser | May 14, 1901 |
| 1,960,515 | Shield | May 29, 1934 |
| 1,992,877 | Monthan | Feb. 26, 1935 |
| 2,344,714 | Martin | Mar. 21, 1944 |
| 2,352,120 | Rappl | June 20, 1944 |

FOREIGN PATENTS

| Number | Country | Date |
|---|---|---|
| 2,009 | Great Britain | of 1912 |
| 5,723 | Great Britain | of 1909 |
| 456,755 | France | of 1913 |